E. SCHELLING.
MACHINE FOR CUTTING FABRIC ALONG THE EDGE OF EMBROIDERY.
APPLICATION FILED AUG. 22, 1911.

1,087,834.

Patented Feb. 17, 1914.
4 SHEETS—SHEET 1.

Witnesses:
C. J. Dulin
V. C. Landenberger

Inventor:
Edmund Schelling
by B. Singer Atty

E. SCHELLING.
MACHINE FOR CUTTING FABRIC ALONG THE EDGE OF EMBROIDERY.
APPLICATION FILED AUG. 22, 1911.

1,087,834.

Patented Feb. 17, 1914.

4 SHEETS—SHEET 2.

Witnesses:
C. T. Dulin
V. C. Landenberger

Inventor:
Edmund Schelling
by B. Singer Atty

COLUMBIA PLANOGRAPH CO., WASHINGTON, D. C.

E. SCHELLING.
MACHINE FOR CUTTING FABRIC ALONG THE EDGE OF EMBROIDERY.
APPLICATION FILED AUG. 22, 1911.
1,087,834.
Patented Feb. 17, 1914.
4 SHEETS—SHEET 3.
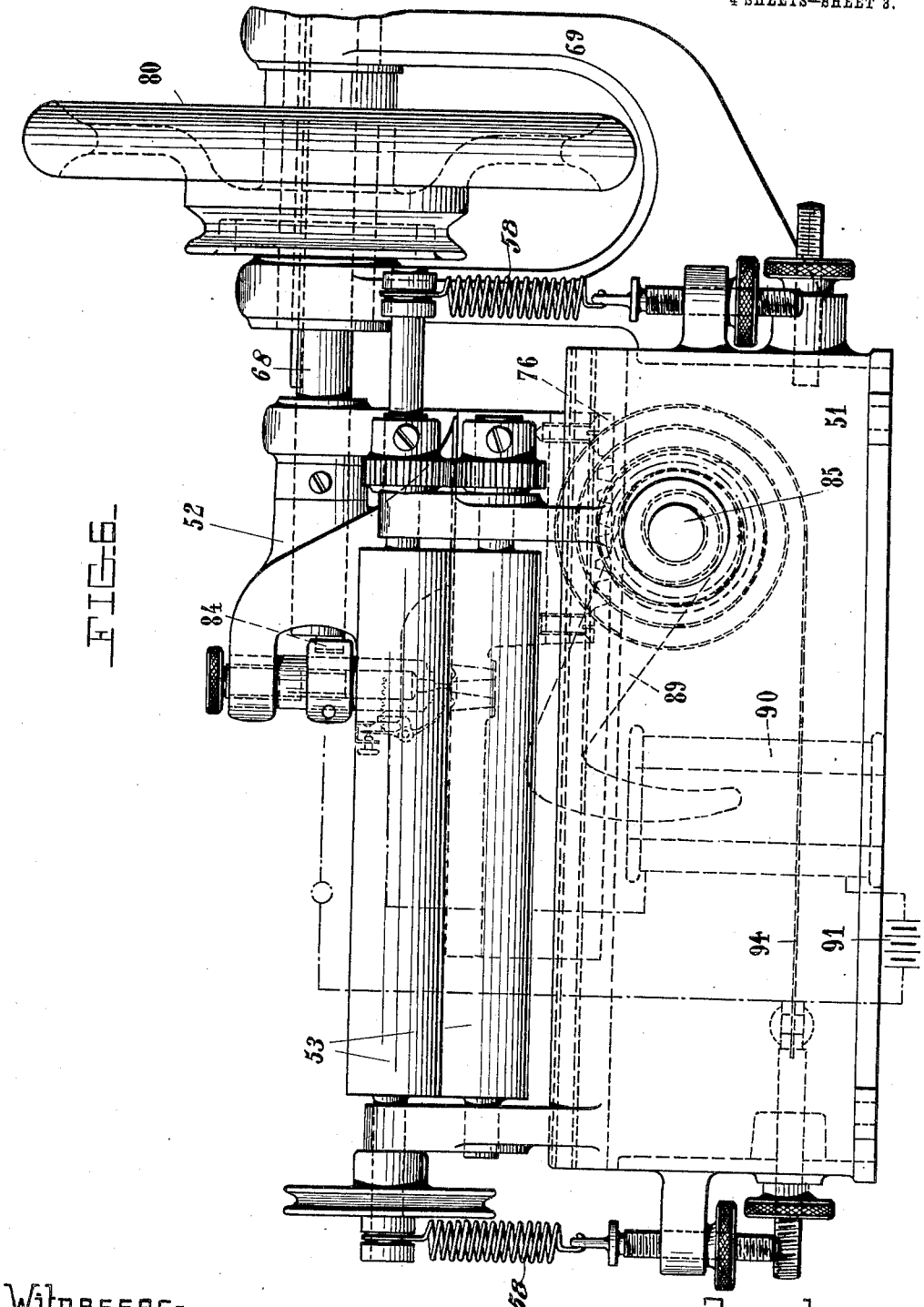

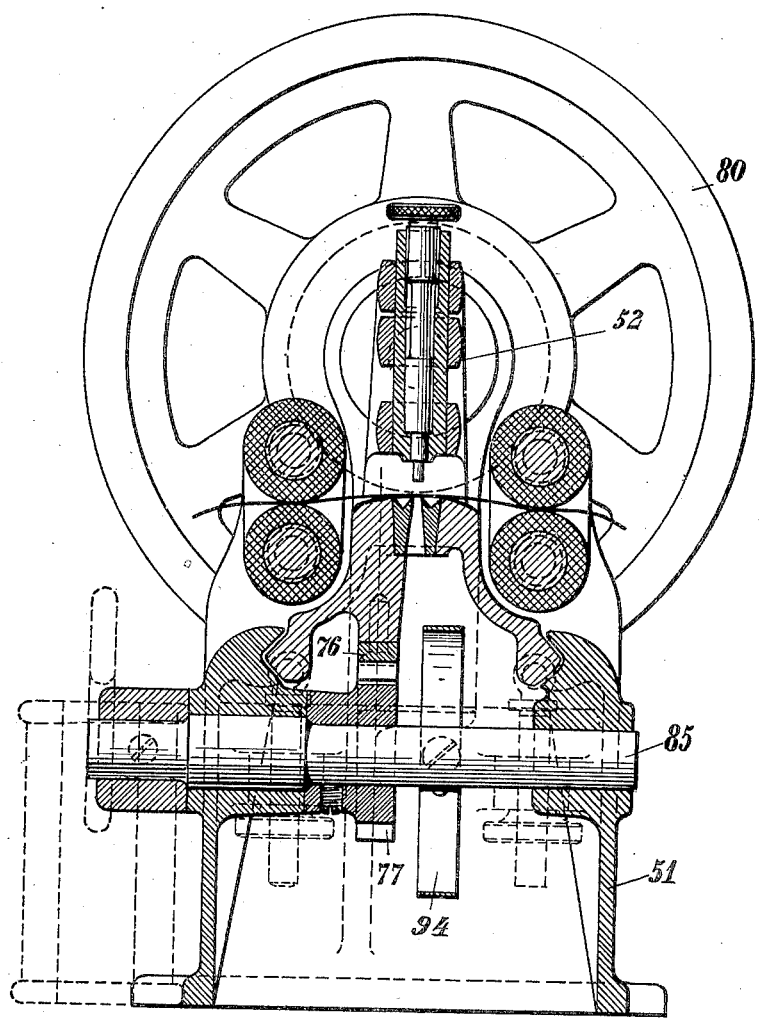

UNITED STATES PATENT OFFICE.

EDMUND SCHELLING, OF ZURICH, SWITZERLAND.

MACHINE FOR CUTTING FABRIC ALONG THE EDGE OF EMBROIDERY.

1,087,834.　　　　　　　Specification of Letters Patent.　　Patented Feb. 17, 1914.

Application filed August 22, 1911. Serial No. 645,446.

*To all whom it may concern:*

Be it known that I, EDMUND SCHELLING, engineer, a citizen of the Swiss Confederation, residing at Gallusstrasse 27, Zurich, Switzerland, have invented new and useful Improvements in Machines for Cutting Fabric Along the Edge of Embroidery, of which the following is a specification.

The object of this invention is the design and construction of a machine for cutting embroidered fabrics along the edge of the embroidery which for instance may be formed with festoons. I attain this object by mounting an oscillating cutting tool on a carriage which is made to move to and fro, the reversing of the motion of the carriage being effected by electrical means.

In the accompanying drawings forming part of this specification two practical embodiments of the invention are represented.

Figure 1:
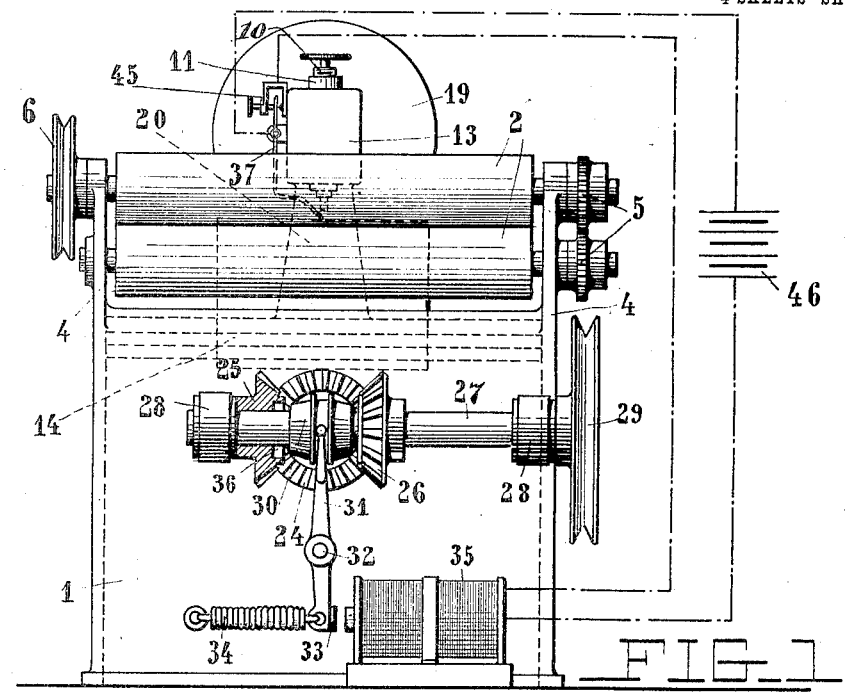
Figure 2:
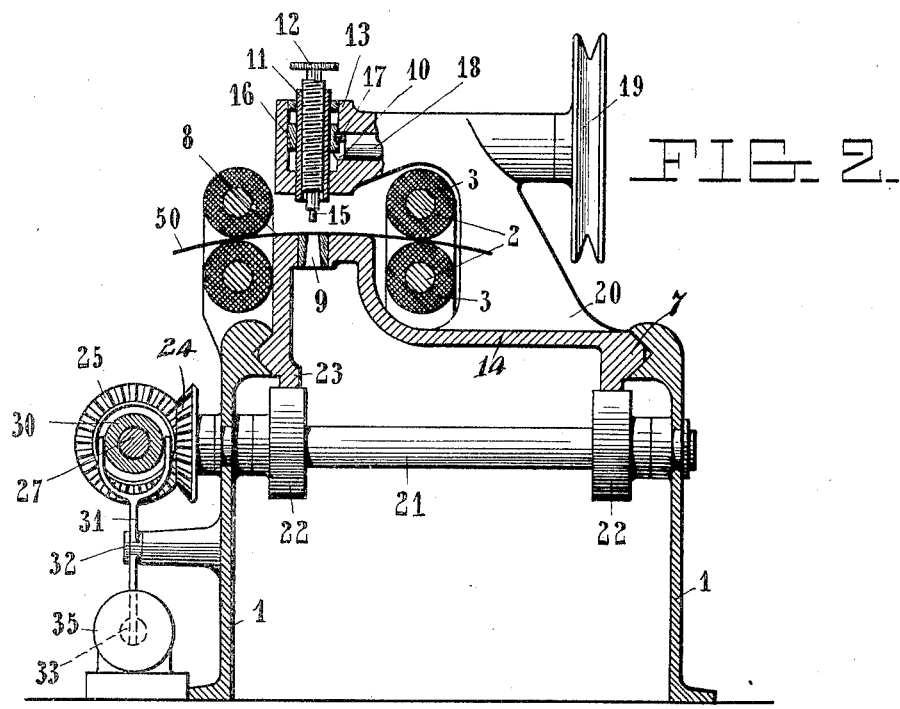
Figure 3:
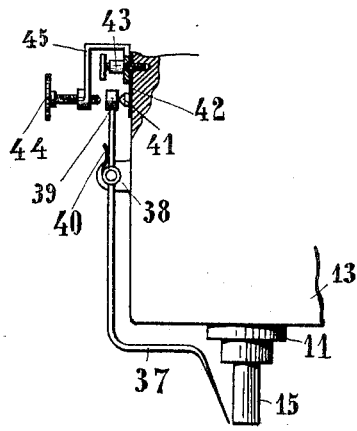
Figure 8:
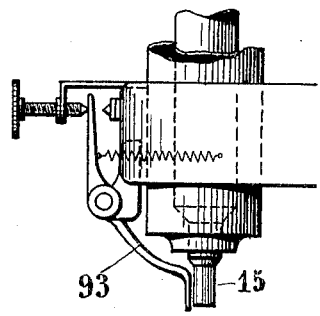
Figure 4:
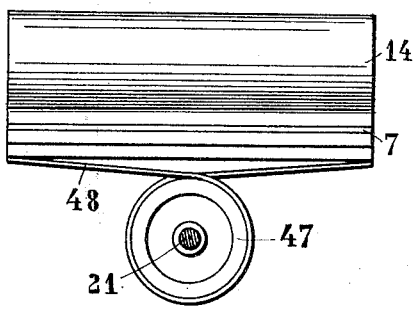
Figure 9:
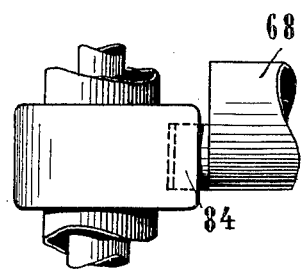
Figure 5:
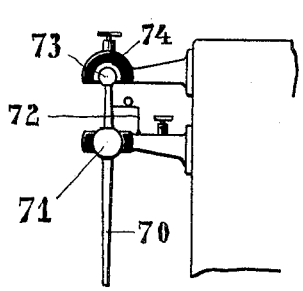
Figure 10:
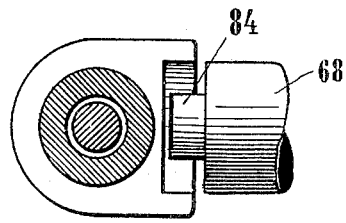

Figure 1 is an elevational view of a machine parts being shown in section. Fig. 2 is an elevational section through the machine. Fig. 3 shows a make and break device on a larger scale. Fig. 4 shows a modified construction of a driving gear for the carriage. Fig. 5 shows a modified construction of a make and break device. Fig. 6 illustrates in an elevational view a second form of construction of my machine. Fig. 7 is a cross section thereof. Fig. 8 shows a make and break device. Figs. 9 and 10 illustrate the device for imparting an oscillating motion to the cutting tool in a side view and in section respectively.

Like numbers of reference designate like parts throughout the specification.

In a frame 1 two pairs of rollers 2 for feeding the fabric are rotatably mounted. The rollers 2 are coated with a mantle of elastic material. On each roller 2 a spur wheel 5 is fixed, the wheels 5 of each pair are in mesh. One roller 2 of each pair of feed rollers is provided with a driving disk 6 by means of which the rollers may be rotated from a shaft not shown in the drawings.

Between the two pairs of rollers 2 a carriage 14 is movably arranged. The carriage 14 is provided with ledges 7 engaging recesses in the frame of the machine. On the carriage 14 a guide piece 8 is arranged over which the fabric is drawn whereby the same is stretched. In an arm 20 of the carriage 14 a sleeve 11 is movably mounted in a vertical boring extending above a vertical boring 9 in the guide piece 8. The cutting tool 15 is inserted in said boring and is held by a screw 12. The fabric is severed by the edges of the boring 9 and of the tool 15. The sleeve 11 and thereby the cutting tool 15 is moved up and down by means of a pin 17 which is eccentrically fixed on a shaft 18. The pin 17 engages a recess of a ring 16 fixed to the sleeve 11, said ring 16 is guided in a boring 13. The shaft 18 is rotatably mounted in the carriage 14 and carries a pulley 19 which is driven from a suitable motor not shown in the drawing. By rotating the shaft 18 the cutting tool 15 is moved up and down whereby the cutting edge of the tool 15 enters the boring 9 cutting thereby the threads of the fabric. The movement of the carriage 14 is effected by a horizontal shaft 21 rotatably mounted in the frame 1. Two friction disks 22 are keyed on said shaft 21 which are in contact with two ledges 23 on the bottom side of the carriage 14. By rotating shaft 21 the carriage 14 is moved in horizontal direction in the one or other direction according to the direction in which the shaft 18 is turned. One end of the shaft 21 protrudes from the frame 1 and carries a bevel gear 24 meshing with two bevel gears 25, 26 loosely mounted on a horizontal shaft 27. Said shaft 27 is journaled in bearings 28 on the frame 1 and is driven from a motor (not shown in the drawings) by means of a disk 29.

Between the gears 25, 26 a sleeve 30 is arranged which is slidably mounted on the shaft 27 but which is prevented from turning thereon. The sleeve 30 has conical ends which ends may enter recesses 36 in the gears 25, 26 thus coupling the one or the other of said gears 25, 26 with the shaft 27. The sleeve 30 may be moved by a double armed lever 31 pivoted at 32. One arm of the lever 31 is bifurcated and engages a groove in the sleeve, the other arm is connected to an armature 33 of an electromagnet 35. The armature 33 is held by a coiled spring 34 fixed with one end to the frame 1 and with the other end to the armature itself. The electromagnet 35 may be excited by a current from a battery 46 as soon as the circuit is closed. To open and to close the circuit through said electromagnet I use a double armed lever 37 which is pivoted at 38 on the arm 20 of the carriage 14. One arm of said lever 37 ends in front of the cutting tool 15. The other end 39 lies between two contacts 41 and 44. The contact 44 is adjustably mounted in a bracket 45 which is fixed by a bolt 43 to the carriage 14 but which is isolated by a plate 42 therefrom. The lever 37 is normally held against the contact 41 by a spring 40. Lever 37 and contact 44 are connected with different poles of the battery 46.

The operation of the machine is as follows: The disks 6, 19 and 29 are driven from a motor each with the proper speed whereby the fabric is slowly fed beneath the cutting tool 15 while the cutting tool receives a quick oscillating movement. The carriage 14 is moved forward against the embroidered part of the fabric by the disk 29 and the friction gears 22 as the spring 34 couples the sleeves 30 the gear 26 with the shaft 27. As soon as the cutting tool 15 comes near the embroidery the lower end of lever 37 will strike against the embroidery which rises from the ground of the fabric. The upper arm of lever 37 now makes contact with the screw 44 whereby the circuit is closed through the electromagnet. The armature 33 is attracted whereby the sleeve 30 is brought out of engagement with the gear 26 and couples the gear 25 with shaft 27 thereby reversing the direction of movement of the carriage 14. The cutting tool 15 moves now away from the embroidery. During the whole travel of the carriage 14 the cutting tool 15 is moved up and down without interruption so that the fabric is cut along the edge of the embroidery. Lever 37 is brought automatically back to the position shown in Fig. 3 by the spring 40 as soon as the lower end recedes from the embroidery. In this moment the circuit is broken the armature 33 returns to its original position owing to the stress of the spring 34 whereby the sleeve 30 is again brought in engagement with the gear 26. The direction of movement of the carriage 14 is reversed and the cutting tool is again advanced and the fabric is severed along the edge of the embroidery.

I wish it clearly understood that I do not confine my invention to this particular construction as some of the details may be varied. As shown in Fig. 4 I may wrap two pliable bands for instance steel bands around a disk 47 on the shaft 21 and fix the ends of said band to the carriage 14. By this means the carriage 14 will readily respond to any movements of the shaft 21. In some cases it may be useful to use a make and break device as shown in Fig. 5. A double armed lever 70 is provided with a ball-shaped piece resting in a suitable bearing 71 in which the lever 70 may turn in any direction. The lower end of lever 70 ends in front of the cutting tool 15 and the upper end forms a ball 73. Over the ball 73 a cup 74 is fixed which is electrically connected with the battery. The lever 70 is normally held by a spring 72 in the position shown in Fig. 5. If the lower end of lever 70 strikes against the embroidery the upper end will come to bear against the cup 74 thus closing the circuit in an analogous manner as described above. I may further arrange several carriages 14 between the feed-rollers each working independently of the other.

In Figs. 6 to 10 another embodiment of my invention is shown the shape and the arrangement of parts differing from the machine described above. In the frame 51 a carriage 52 is slidably mounted between two pairs of feed rollers 53 adapted to feed the fabric below a cutting tool 15. The feed-rollers 53 are positively driven the upper roller of each pair is pressed on the lower by means of adjustable springs 58. In the carriage 52 a shaft 68 is rotatably mounted. Said shaft 68 is parallel to the axis of the feed rollers 53. One end of the shaft 68 is provided with an eccentrically arranged pin 84. The other end projects into a central boring of a wheel 80 which is rotatably mounted in a bearing 69 of frame 51. Shaft 68 has a key which engages a groove in the boring of the wheel 80. The carriage 51 may slide in the frame and receive a rotary motion from said wheel 80. The carriage 52 has at its bottom side a rack 76 with which a toothed gear 77 is in engagement. The gear 77 is keyed on a shaft 85 which is rotatably mounted in the frame 51. On shaft 85 a lever 89 is fixed the free end of which is bent downwardly and projects into the boring of an electromagnet 90. The electromagnet 90 forms a part of a circuit which contains a battery 91 and a make and break device as shown in Fig. 8, which is mounted on the carriage 52. If the electromagnet is excited the lever 89 will be drawn downward and the shaft is rotated whereby the carriage 52 is moved in the one direction. As soon as the circuit is broken in consequence of the lever 93 striking against the embroidery the carriage 52 is drawn back by means of a coiled spring 94 one end of which is fixed to the shaft, the other one to the frame 51. The operation of this machine is much the same as described with reference to the first example.

Having described my invention I claim:

1. A machine for cutting fabric comprising means for feeding the fabric, a carriage with a reciprocating cutting tool, means to move the carriage, electrical means to reverse the direction of travel of the carriage and a contact device arranged to close a circuit through the electrical means upon engagement of said contact device with the edge of the fabric.

2. A machine for cutting fabric comprising pairs of rollers for feeding the fabric, a carriage slidably mounted in the frame of the machine, a reciprocating cutting tool mounted on said carriage, a shaft adapted to move said carriage, electrical means to reverse the direction of rotation of said shaft and a circuit closer for said electrical means arranged to close a circuit through the means upon contact with the edge of the fabric, said circuit closer being mounted on said carriage.

3. A machine for cutting fabric comprising in combination, means for feeding the fabric, a carriage with a reciprocating cutting tool, means for moving the carriage, and electrical means for reversing the direction of movement of the carriage and a circuit closer carried by the carriage and arranged to close a circuit through the electrical means by engagement with the edge of the fabric, substantially as described.

4. A machine for cutting fabric comprising in combination, means for feeding the fabric, a carriage with a reciprocating cutting tool, means to move the carriage, and means controlled by the material for reversing the direction of travel of the carriage, the last mentioned means including a circuit closer adapted to control the operation of the reversing means through contact with the edge of the fabric, substantially as described.

5. A machine for cutting sheet material comprising in combination, means for feeding the material in one direction in a fixed line of travel, a carriage movable along the material in a fixed line of travel in a direction angular to the direction of movement of the material, a cutting tool carried by the carriage, and electrical means controlled by engagement with the advancing material for reversing the direction of travel of the carriage and including a circuit closer supported on the carriage and adapted to close a circuit through the electrical means upon contact with the edge of the fabric, substantially as described.

6. A machine for cutting fabric comprising in combination, means for feeding the fabric in one direction, a carriage with a reciprocating cutting tool movable in a direction angular to the direction of movement of the fabric, means for moving the carriage in reverse direction, and electrical means controlled by engagement with the material for reversing the direction of movement of the carriage, and including a circuit closer adapted for engagements with the edge of the fabric to close a circuit through the electrical means, substantially as described.

7. A machine for cutting fabric of that character having a surface portion elevated or raised with respect to the ground of the fabric, comprising in combination, means for advancing the fabric, a carriage having a cutting tool for cutting the fabric, a feeler carried by the carriage and adapted to engage the raised portion of the fabric and close a circuit, and electrical means actuated by the circuit closed by said feeler for reversing the direction of movement of the carriage, substantially as described.

In testimony whereof I affix my signature in presence of two witnesses.

EDMUND SCHELLING.

Witnesses:
 F. ISLER,
 AUGUST RÜEGG.

---

Copies of this patent may be obtained for five cents each, by addressing the "Commissioner of Patents, Washington, D. C."